United States Patent
Woods et al.

(10) Patent No.: US 9,288,531 B2
(45) Date of Patent: *Mar. 15, 2016

(54) METHODS AND SYSTEMS FOR COMPENSATING FOR DISABILITIES WHEN PRESENTING A MEDIA ASSET

(71) Applicant: Rovi Guides, Inc., Santa Clara, CA (US)

(72) Inventors: Thomas Woods, Arlington Heights, IL (US); Amanda Mallardo, Streamwood, IL (US); William Korbecki, Crystal Lake, IL (US); Brian Peterson, Barrington, IL (US); David Wheatley, Tower Lakes, IL (US); Jason Conness, Pasadena, CA (US)

(73) Assignee: Rovi Guides, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/560,956

(22) Filed: Dec. 4, 2014

(65) Prior Publication Data

US 2015/0106829 A1    Apr. 16, 2015

Related U.S. Application Data

(63) Continuation of application No. 13/896,920, filed on May 17, 2013, now Pat. No. 8,930,975.

(51) Int. Cl.
*H04N 21/435* (2011.01)
*H04N 21/488* (2011.01)
*H04N 21/442* (2011.01)
*H04N 21/45* (2011.01)
*H04N 21/81* (2011.01)

(52) U.S. Cl.
CPC ....... *H04N 21/435* (2013.01); *H04N 21/44213* (2013.01); *H04N 21/44218* (2013.01); *H04N 21/44222* (2013.01); *H04N 21/4532* (2013.01); *H04N 21/488* (2013.01); *H04N 21/8133* (2013.01); *H04N 21/8106* (2013.01); *H04N 21/8146* (2013.01)

(58) Field of Classification Search
CPC .............. H04N 21/435; H04N 21/488; H04N 21/44213; H04N 21/44218; H04N 21/4532
See application file for complete search history.

(56) References Cited

U.S. PATENT DOCUMENTS

| 7,996,878 B1 | 8/2011 | Basso et al. |
| 2009/0094628 A1 | 4/2009 | Lee et al. |
| 2009/0310939 A1* | 12/2009 | Basson ............ H04N 21/44213 386/239 |

* cited by examiner

*Primary Examiner* — Hai V Tran
(74) *Attorney, Agent, or Firm* — Ropes & Gray LLP

(57) ABSTRACT

Methods and systems are disclosed herein for supplementing media assets in order to compensate for a particular disability of a user. Specifically, a media guidance application determines whether or not a user can comprehend a media asset based on the particular disability of the user. Upon determining that the user cannot comprehend the media asset, the media guidance application supplements the media asset with supplemental data, which compensates for the particular disability of the user.

18 Claims, 7 Drawing Sheets

METHODS AND SYSTEMS FOR COMPENSATING FOR DISABILITIES WHEN PRESENTING A MEDIA ASSET

RELATED APPLICATIONS

This application is a continuation of and claims priority to U.S. application Ser. No. 13/896,920, filed May 17, 2013. The specification of the forgoing application is incorporated herein by reference in its entirety.

BACKGROUND OF THE INVENTION

Media assets often rely on the various senses of a user to convey information. For example, the context of a movie often relies on audio information (e.g., sounds, music, character dialogue, etc.) as well as video information (e.g., scenery, appearances of characters, actions performed by characters, etc.). Consequently, if users have a disability (e.g., blindness, deafness, etc.), the ability of the user to comprehend the movie may be limited.

While some methods of conveying audio information visually (e.g., subtitles) are known, these methods are typically limited to transcribing character dialogue and do little to describe the actual context of a media asset. Furthermore, these methods (e.g., subtitles) are generated in a "one-type-fits-all" manner, and therefore are not customized to compensate for the disabilities of a particular user.

SUMMARY OF THE DISCLOSURE

Accordingly, methods and systems are disclosed herein for supplementing media assets in order to compensate for a particular disability of a user. Specifically, a media guidance application determines whether or not a user can comprehend a media asset based on the particular disability of the user. Upon determining that the user cannot comprehend the media asset, the media guidance application supplements the media asset with supplemental data, which compensates for the particular disability of the user.

In some embodiments, the media guidance application determines a measure of a sensory disability of a user and determines, based on the measure of the sensory disability of the user, whether or not the user can comprehend a received media asset. In response to determining the user cannot comprehend the media asset based on the measure of the sensory disability of the user, the media guidance application requests supplemental data, which corresponds to the measure of the sensory disability of the user. The media guidance application then supplements the media asset with the supplemental data such that the user can comprehend the media asset.

In some embodiments, the media guidance application determines a user disability level, which is based on the measure of sensory disability of the user, determines a threshold disability level for the media asset, which indicates a measure of disability that would prevent users from comprehending the media asset, and compares the threshold disability level to the user disability level. For example, the media guidance application may individually determine threshold disability levels for a plurality of media assets. If the threshold disability level for the media asset exceeds the user disability level, the media guidance application presents the media asset with the supplemental data, and if the supplemental data is not available, the media guidance application presents an alternative media asset. If the threshold disability level does not exceed the user disability level, the media guidance application presents the media asset without the supplemental data.

In some embodiments, the media guidance application determines an adjusted threshold disability level for a presentation of the media asset with the supplemental data in which the adjusted threshold disability level indicates a measure of disability that would prevent users from comprehending the media asset with the supplemental data, compares the adjusted threshold disability level to the user disability level, and supplements the media asset with the supplemental data in response to determining that the user disability level exceeds the adjusted threshold disability level. Furthermore, in some embodiments, the media guidance application determines a difference between the threshold disability level and the user disability level, and cross-references the difference with a database associated with measures for disabilities to identify the supplemental data based on the supplemental data resulting in the adjusted threshold disability level being below the user disability level.

In some embodiments, the media guidance application determines the measure of the sensory disability of the user by monitoring user inputs, associated with media assets, of the user to generate a user profile, and cross-referencing the user profile with a database associated with measures for disabilities to determine the measure of the sensory disability of a user. For example, based on prior interactions with the media guidance application, the media guidance application develops a user profile of the user. The user profile of the user tracks the abilities and disabilities of the user in order to supplement media assets to compensate for the particular disabilities of the user.

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF DRAWINGS

Figure 1:
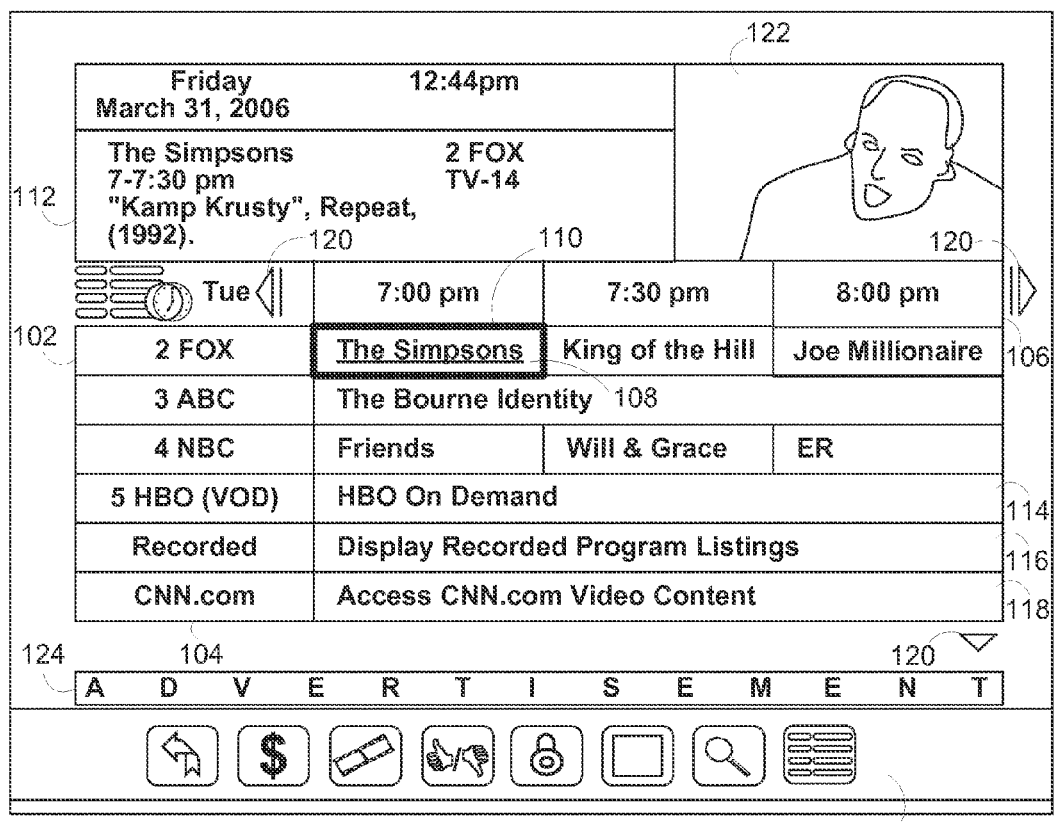
FIG. 1 shows an illustrative example of a media guidance application in accordance with some embodiments of the disclosure.

Methods and systems are provided herein for supplementing media assets in order to compensate for a particular disability of a user. Specifically, a media guidance application determines whether or not a user can comprehend a media asset based on the particular disability of the user. Upon determining that the user cannot comprehend the media asset, the media guidance application supplements the media asset with supplemental data which compensates for the particular disability of the user.

An application that provides guidance through an interface that allows users to efficiently navigate content selections, easily identify content that they may desire, and present the content is referred to herein as an interactive media guidance application or, sometimes, a media guidance application or a guidance application. Interactive media guidance applications may take various forms depending on the content for which they provide guidance. One typical type of media guidance application is an interactive program guide. Interactive program guides (sometimes referred to as electronic program guides) are well-known guidance applications that, among other things, allow users to navigate among and locate many types of content or media assets.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, games, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

As used herein, "supplemental data" refers to any data intended to supplement a media asset in order to compensate for a disability of a user as determined by the media guidance application. For example, supplemental data may include instructions for displaying media objects or instructions for altering/adjusting the presentation of a media asset. In addition, in some embodiments, supplemental data may include, but is not limited to, a media asset (e.g., as described above) related to the media asset that it supplements, or a function of the media guidance application (e.g., to play a media asset, to perform a playback alteration operation on a media asset, to search for data, to post data on-line, to generate recommendations featuring media objects and/or media assets, to enable content controls, to download data, or to enable display of a media asset and/or media object on another device). As used herein, a "media object" refers to human-readable and/or human-recognizable data that may be manipulated by a user operating a user device upon which the media guidance application is implemented. A media object may be a variable, function, or file.

As used herein, a "disability" is an impairment that may be sensory, cognitive, mental, emotional, developmental, or some combination of these. A sensory disability is an impairment of one of the senses. Sensory disabilities may include, but are not limited to, vision impairment (e.g., partial or complete vision loss, colorblindness, sensitivity to bright lights, astigmatisms, etc.) and hearing impairment (e.g., partial or complete hearing loss, sensitivity to loud noises, etc.).

A cognitive disability may include any characteristic that acts as a barrier to the cognition process. Cognitive disabilities may include, but are not limited to, specific deficits in cognitive abilities (e.g., learning disorders, dyslexia, etc.) or drug-induced cognitive/memory impairment. A mental disability or mental illness is a psychological or behavioral pattern generally associated with subjective distress or disability that occurs in an individual, and perceived by the majority of society as being outside of normal development or cultural expectations, and a developmental disability is any disability that results in problems with growth and development. In addition, as used herein, a "measure of a disability" is a qualitative or quantitative description of the impairment or the extent of the impairment of the user.

As used herein, a "demographic category" refers to a subset of users defined by having (or not having) one or more similar characteristics. Demographic characteristics may include, but are not limited to, gender, age, ethnicity, knowledge of languages, disabilities, mobility, education level, employment status, location, learned skills sets, etc. In some embodiments, a demographic category may be determined based on demographic data, which may include or imply one or more demographic characteristics.

For example, certain demographic categories may not be able to comprehend all media assets easily and efficiently. For example, certain demographic categories (e.g., people that are color blind) may not comprehend the entirety of a media asset (e.g., portions of the media asset requiring a user to differentiate colors). Therefore, the media guidance application may supplement the media asset with supplemental data (e.g., textual descriptions of the various colors). In another example, the media guidance application may determine that the user is completely blind. In response, the media guidance application may supplement the media asset with audio descriptions of the content. In yet another example, the media guidance application may determine that the user is partially deaf. In response, the media guidance application may supplement the media asset with supplemental data that instructs a user device to maintain a volume level over a particular level (e.g., even when characters on-screen are whispering) in order to ensure the user can hear the media asset. Finally, in another example, the media asset may determine the user is a slow reader (e.g., due to partial blindness, dyslexia, etc.), in response the media guidance application may supplement the media asset with supplemental data that instructs a user device to display on-screen text, or frames with on-screen text, for extended period of time.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens.

In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

A media guidance application may present or provide access to numerous media assets and/or media objects. In addition, a media guidance application may present or provide numerous functions (i.e., operations that may be performed on a media assets and/or media object). One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
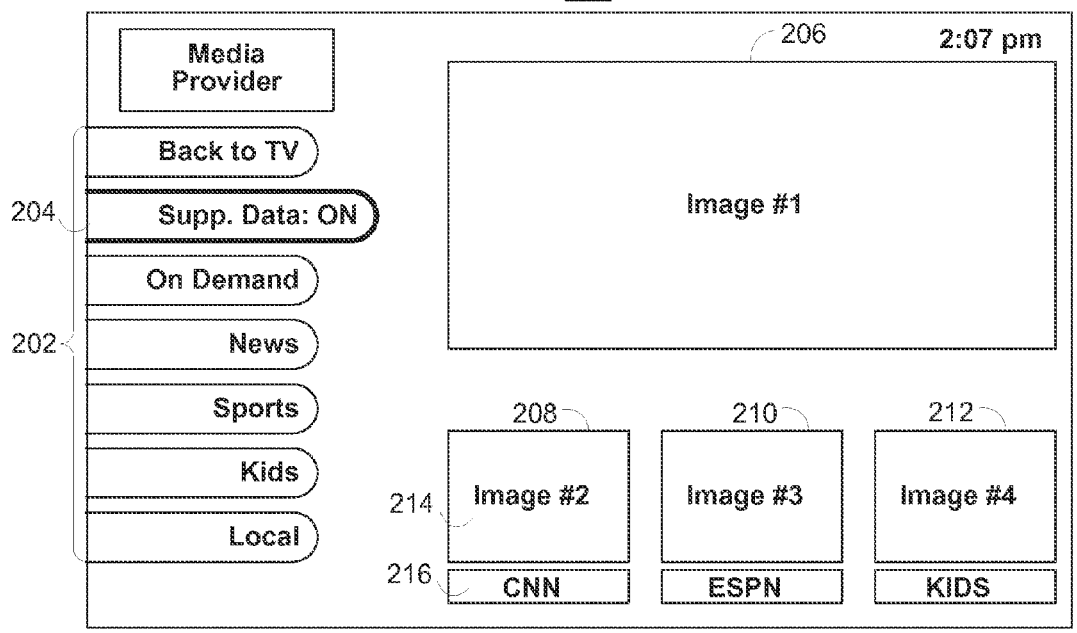
FIG. 2 shows another illustrative example of a media guidance application in accordance with some embodiments of the disclosure.

FIGS. 1-2 show illustrative display screens that may be used to provide media guidance data. The display screens shown in FIGS. 1-2 and 5A-C may be implemented on any suitable user equipment device or platform. While the displays of FIGS. 1-2 and 5A-C are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, selectable option 204 is selected. Selectable option 204 corresponds to initiating the supplementation of media assets with supplemental data. For example, the media guidance application may generate display 520 (FIG. 5B) instead of display 500 (FIG. 5A) in response to the selection of selectable option 204. In display 200 the listings may provide interface design elements including cover art, still images from the content, video clip previews, live video from the content, fonts, colors, graphics, styles, or other types of decoration and/or ornamentation that indicate and accentuate the content being described by the media guidance data and presented by the media guidance application. Each of the graphical listings may also be accompanied by text to provide further information about the content associated with the listing. For example, listings 208, 210, and 212 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
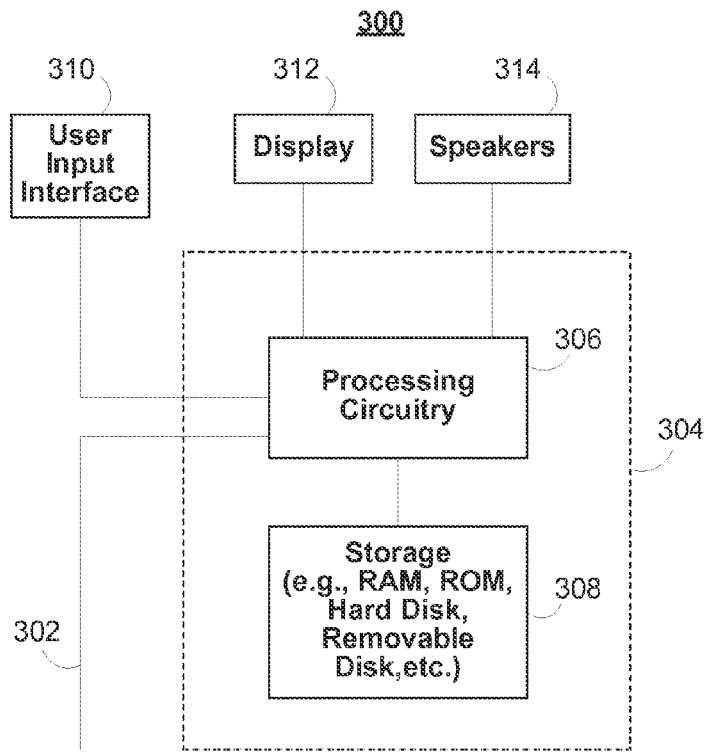
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user input interface type, such as a remote control, mouse, trackball, keypad, keyboard, touch screen, touchpad, stylus input, joystick, voice recognition interface, image recognition interface, motion-sensing and/or motion-control interface, and/or other user input interface type discussed herein. It should be noted that embodiments herein may include multiple user input interface types or a user input interface, which incorporates multiple types of user input interfaces.

In some embodiments, the media guidance application may receive and/or detect demographic data about a user. For example, the media guidance application may actively or passively monitor the user to build a profile of demographic data of the user. For example, the media guidance application may receive demographic data via user inputs describing the user. Additionally or alternatively, the media guidance application may passively gather information about the user from sources that may be indicative of demographic data of a user (e.g., search histories, on-line profiles, accounts associated with the user, user data repositories, etc.).

For example, the media guidance application may incorporate or have access to one or more content-recognition modules, which may be used by the media guidance application to analyze information received from a content capture device (e.g., video and/or audio recorder). For example, the media guidance application may include an object recognition module. The object recognition module may use edge detection, pattern recognition, including, but not limited to, self-learning systems (e.g., neural networks), optical character recognition, on-line character recognition (including, but not limited to, dynamic character recognition, real-time character recognition, intelligent character recognition), and/or any other suitable technique or method to determine the objects in and/or characteristics of video and audio content. For example, the media guidance application may receive a media asset in the form of a video (e.g., an audio/video recording of a user). The video may include a series of frames. For each frame of the video, the media guidance application may use an object recognition module to determine the content and context of a media asset for use in determining whether or not a user will comprehend the media asset (or portion of the media asset) based on a disability associated with the user.

In some embodiments, the content-recognition module or algorithm may also include audio analysis and speech recognition techniques, including, but not limited to, Hidden Markov Models, dynamic time warping, and/or neural networks (as described above) to process audio data and/or translate spoken words into text. The content-recognition module may also use any other suitable techniques for processing audio and/or visual data. For example, the content-recognition module may analyze audio data to determine a likely age, ethnicity, language spoken by the user, etc.

In addition, the media guidance application may use multiple types of optical character recognition and/or fuzzy logic, for example, when analyzing subtitles (e.g., in order to determine the circumstances and/or context of a media asset) or comparing multiple data fields (e.g., as contained in databases described below). For example, the media guidance application may arrange the text into data fields and cross-reference the data fields with other data fields (e.g., in a lookup table database). Using fuzzy logic, the system may determine two fields and/or values to be identical even though the substance of the data field or value (e.g., two different spellings) is not identical. In some embodiments, the system may analyze particular data fields of a database for particular values or text. Furthermore, the data fields could contain values (e.g., the data fields could be expressed in binary or any other suitable code or programming language) other than human-readable text.

Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
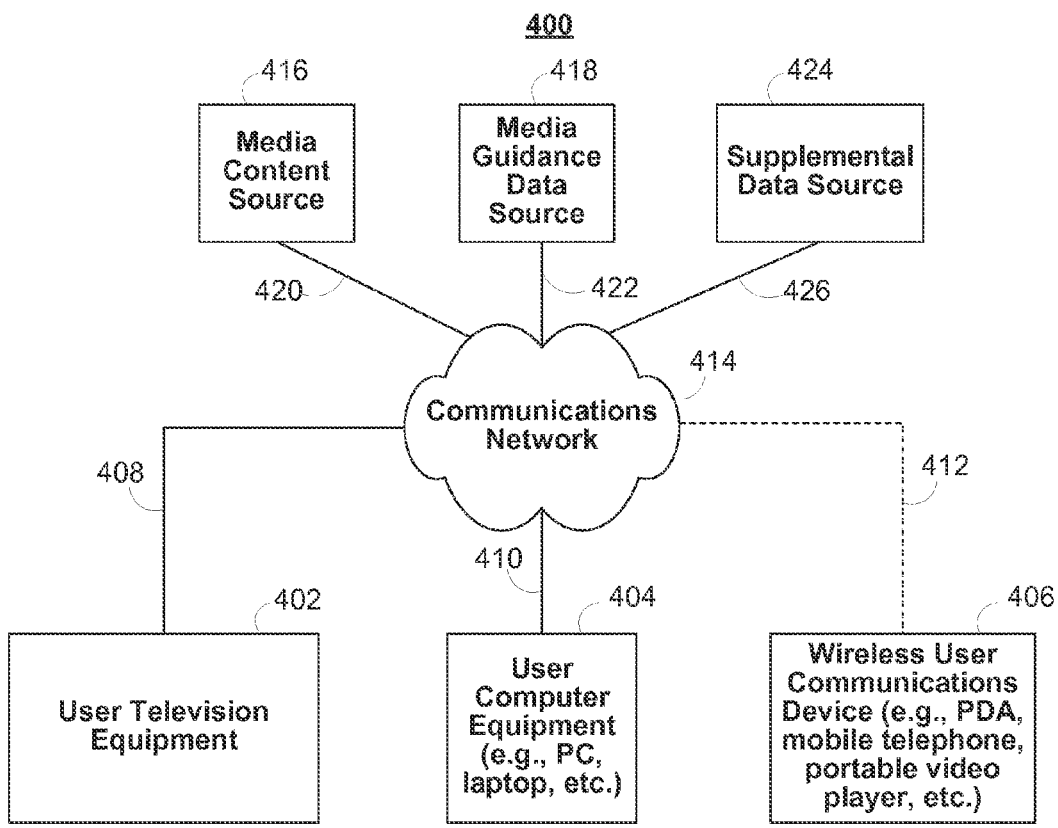
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices.

Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416, media guidance data source 418, and supplemental data source 424 coupled to communications network 414 via communication paths 420, 422, and 426, respectively. Paths 420, 422, and 426 may include any of the communication paths described above in connection with paths 408, 410, and 412. Communications with the content source 416, media guidance data source 418, and supplemental data source 424 may be exchanged over one or more communications paths, but are shown as a single path in FIG. 4 to avoid overcomplicating the drawing. In addition, there may be more than one of each of content source 416, media guidance data source 418, and supplemental data source 424, but only one of each is shown in FIG. 4 to avoid overcomplicating the drawing. (The different types of each of these sources are discussed below.) If desired, content source 416, media guidance data source 418 and supplemental data source 424 may be integrated as one source device. Although communications between sources 416, 418, and 426 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

Supplemental data source 424 may provide supplemental data, such as the supplemental data described above. Supplemental data may be provided to the user equipment devices using any suitable approach. In some embodiments, the media guidance application may be a stand-alone interactive program guide that receives program guide data via a data feed (e.g., a continuous feed or trickle feed). Supplemental data and media guidance data may be provided to the user equipment on a television channel sideband, using an in-band digital signal, using an out-of-band digital signal, or by any other suitable data transmission technique. Supplemental data and other media guidance data may be provided to user equipment on multiple analog or digital television channels.

In some embodiments, data from media guidance data source 418 and supplemental data source 424 may be provided to users' equipment using a client-server approach. For example, a user equipment device may pull data from a server, or a server may push data to a user equipment device. In some embodiments, a media guidance application client residing on the user's equipment may initiate sessions with media guidance data source 418 and supplemental data source 424 to obtain data when needed, e.g., when the data is out of date or when the user equipment device receives a request from the user to receive data. Data may be provided to the user equipment with any suitable frequency (e.g., continuously, daily, a user-specified period of time, a system-specified period of time, in response to a request from user equipment, etc.). Media guidance data source 418 and supplemental data source 424 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418 or supplemental data source 424), the media guidance application may instruct the control circuitry to generate the guidance application displays and transmit the generated displays to the user equipment devices. The server application may instruct the control circuitry of the media guidance data source 418 or supplemental data source 424 to transmit data for storage on the user equipment. The client application may instruct control circuitry of the receiving user equipment to generate the guidance application displays.

Content and/or data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416, media guidance data sources 418 or supplemental data source 424. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5A:
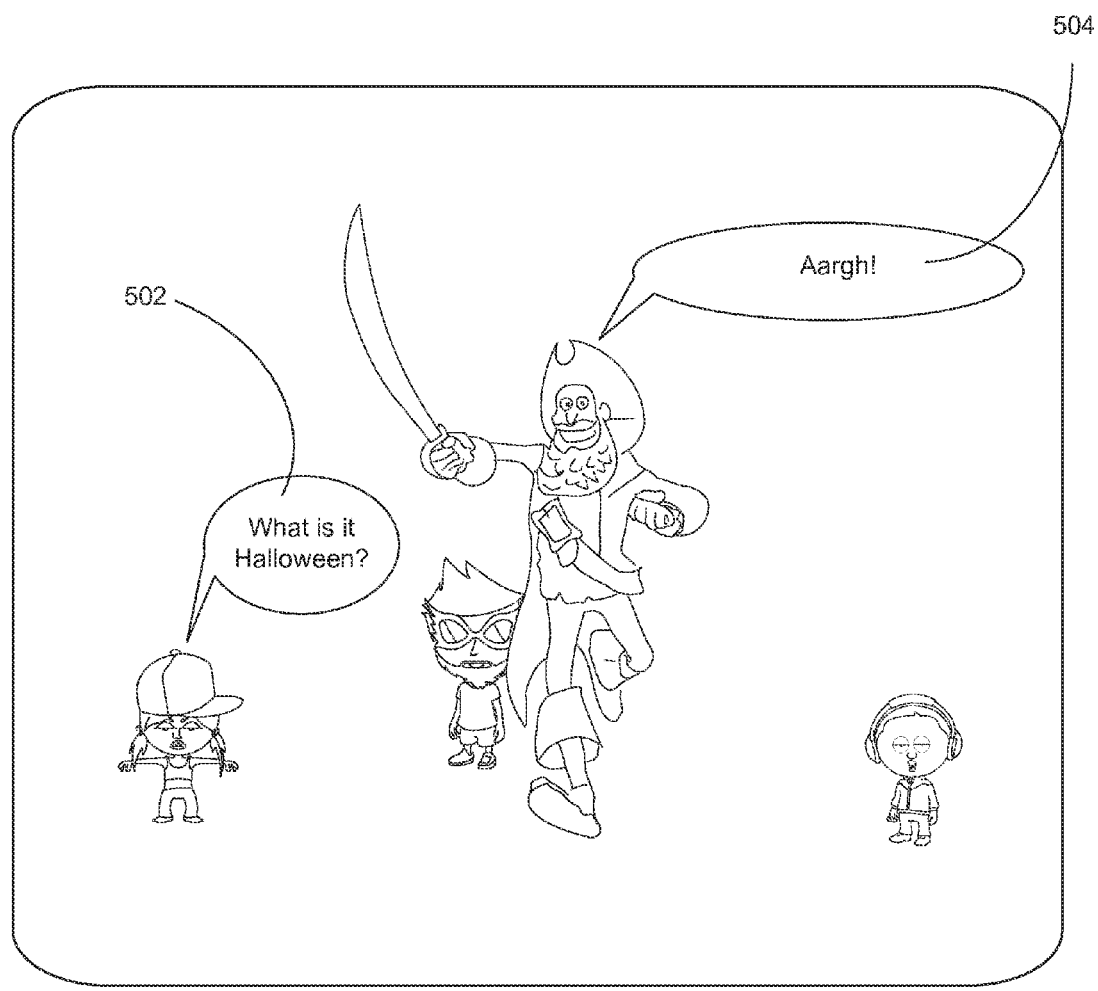
FIG. 5A shows an illustrative example of a display featuring a media asset that is not supplemented by supplemental data in accordance with some embodiments of the disclosure.
Figure 5B:
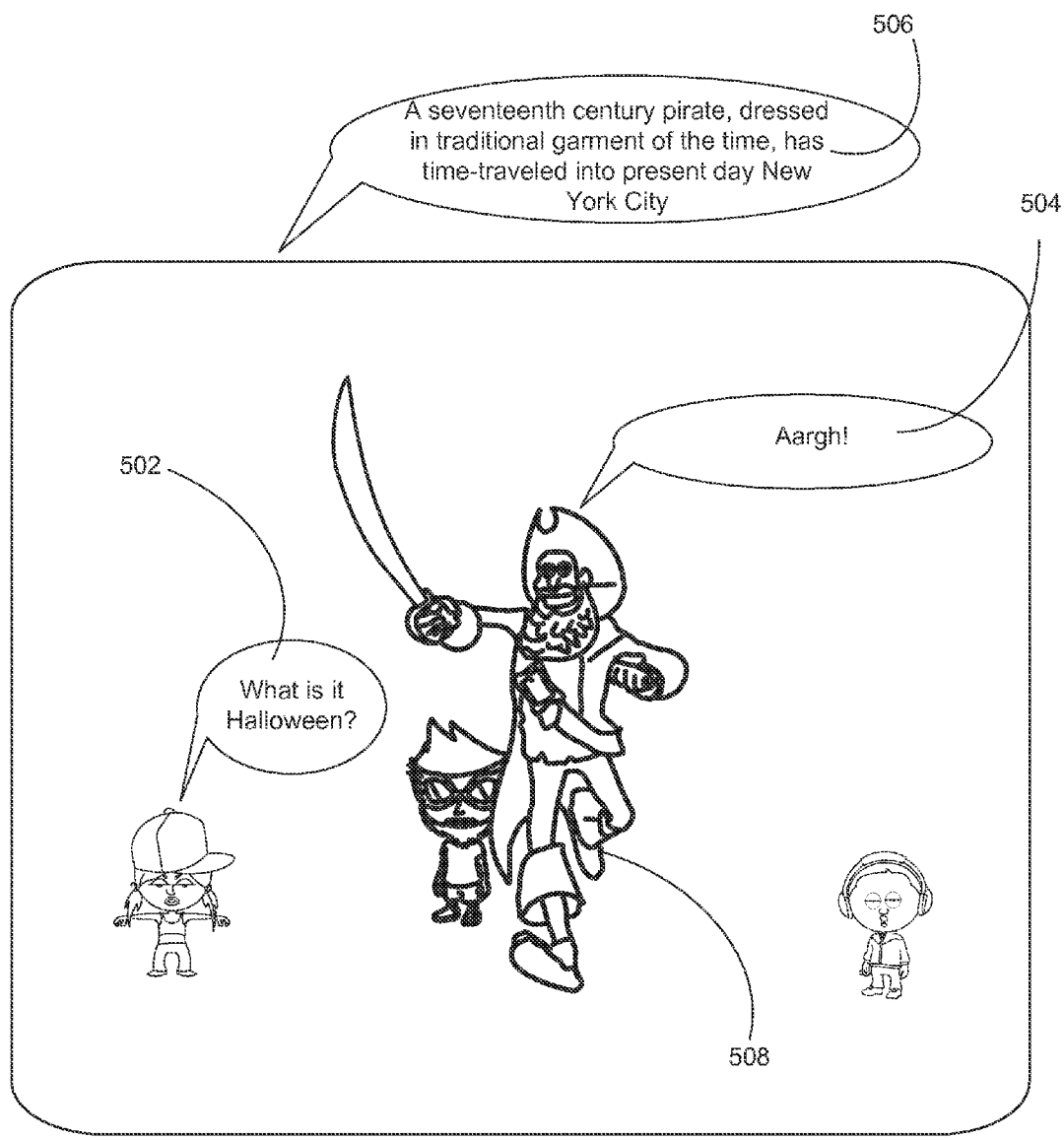
FIG. 5B shows an illustrative example of a display featuring the display of FIG. 5A supplemented by supplemental data in accordance with some embodiments of the disclosure.
Figure 5C:
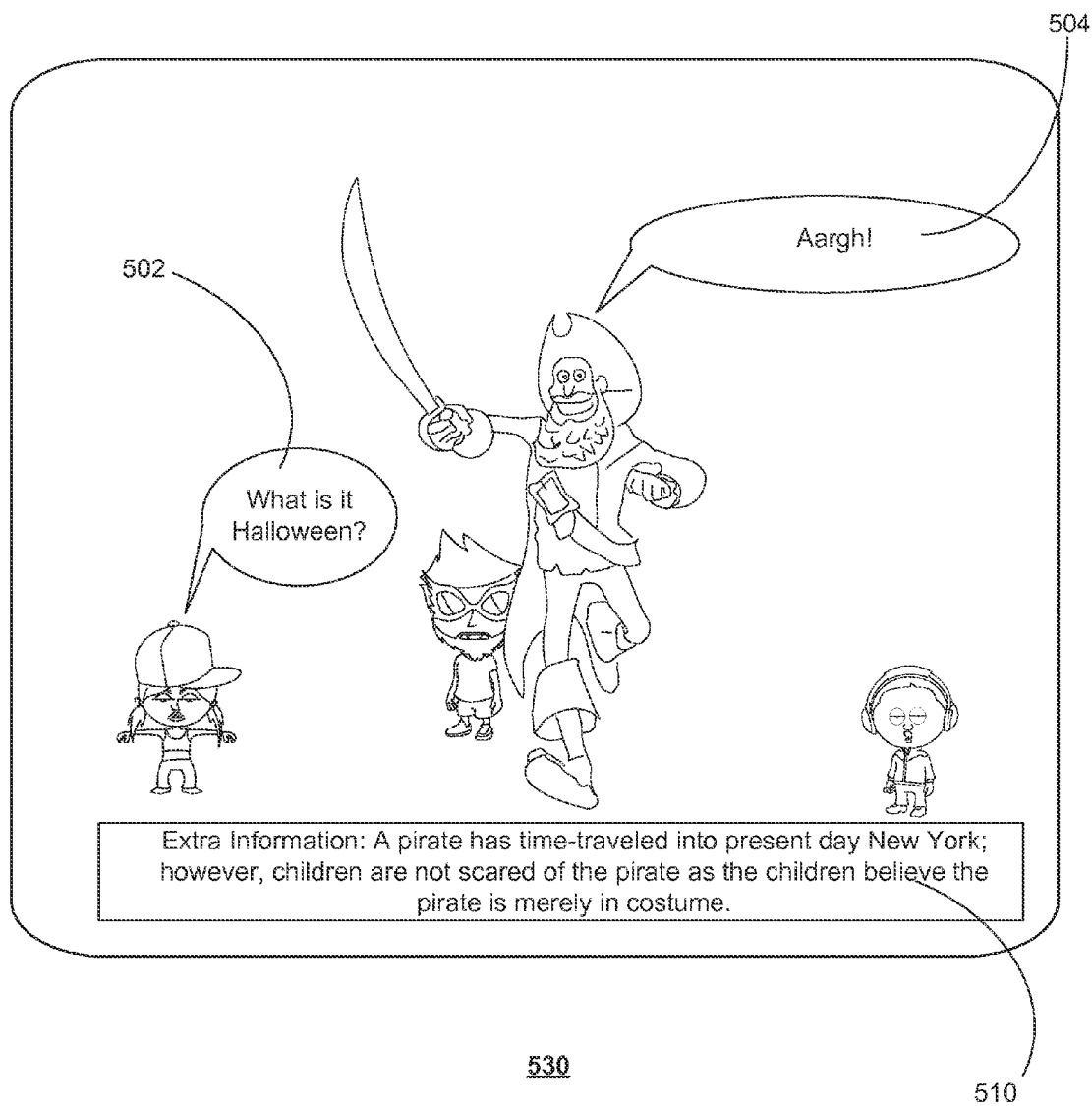
FIG. 5C shows another illustrative example of a display featuring the display of FIG. 5A supplemented by supplemental data in accordance with some embodiments of the disclosure.

FIGS. 5A-C provides illustrative examples of the media guidance application supplementing a media asset with supplemental data. FIG. 5A shows an illustrative example of a display featuring a media asset that is not supplemented by supplemental data in accordance with some embodiments. It should be noted that display 500 is illustrative only and should not be taken to be limiting in any manner. For example, in some embodiments, one or more of the features of display 100 and/or display 200 may be incorporated into display 500. In some embodiments, display 500 may appear on the display (e.g., display 312 (FIG. 3)) of a user equipment device (e.g., user equipment device 402, 404, and/or 406 (FIG. 4)). Moreover, the media guidance application may use one or more steps from one or more of the processes described in FIGS. 6-7 below to generate display 500 or any of the features described therein.

Display 500 represents a scene from a media asset (e.g., an advertisement). In particular, the scene includes media object 502 and media object 504, which are interacting. The circumstances and the context of this scene are provided to the viewer through multiple sensory channels. For example, media object 502 is shown to be a young child (e.g., as determined by the appearance (size, outfit, etc.) of media object 502). Media object 504 is shown to be an adult pirate (e.g., as determined by the appearance (size, outfit, etc.) of media object 504). Furthermore, due to the expression on the face of media object 502, a user can determine that media object 502 is not scared of media object 504. In addition, the dialogue and/or sounds associated with media object 502 and media object 504 provide additional context to the scene. Specifically, although the media object 504 is heard to be yelling, media object 502 is not scared because media object 502 does not believe media object 504 is a real pirate (e.g., as indicated by dialogue associated with media object 502).

As the circumstances and the context of this scene are provided to the viewer through multiple sensory channels, a viewer with one or more disabilities may not fully appreciate the circumstances and/or context of the media asset. For example, a viewer that is completely or partially blind may not realize that media object 504 is dressed as a pirate. Likewise, a viewer that is completely or partially deaf may not realize that media object 502 is not scared.

FIG. 5B shows an illustrative example of a display featuring the display of FIG. 5A supplemented by supplemental data in accordance with some embodiments. It should be noted that display 520 is illustrative only and should not be taken to be limiting in any manner. For example, in some embodiments, one or more of the features of display 100 and/or display 200 may be incorporated into display 520. In some embodiments, display 500 may appear on the display (e.g., display 312 (FIG. 3)) of a user equipment device (e.g., user equipment device 402, 404, and/or 406 (FIG. 4)). Moreover, the media guidance application may use one or more steps from one or more of the processes described in FIGS. 6-7 below to generate display 520 or any of the features described therein.

In display 520, the media asset of display 500 (FIG. 5A) has been supplemented with supplemental data. Specifically, the media asset of display 520 now includes audio announcement 506, which provides a verbal description of the circumstances and context appearing in the media asset. In addition, the display settings (e.g., brightness, contrast, etc.) have been adjusted as shown by visual characteristic 508.

For example, a media guidance application (e.g., implemented on user equipment 402, 404, and/or 406 (FIG. 4)) may have determined that based on a measure of a disability of the user, that the user cannot comprehend the media asset. For example, the media guidance application may have determined (e.g., using control circuitry 304 (FIG. 3)) that the user was partially blind (e.g., has a visual acuity below 20/20). In another example, the media guidance application may have determined that the user is sensitive to flashing lights, as such visual characteristic 508 may represent the normalization of flashing with regard to media object 504. In response to determining the user cannot comprehend the media asset based on the disability, the media guidance application may have requested supplemental data, which corresponds to the measure of the disability of the user. For example, the media guidance application may have cross-referenced a qualitative (e.g., partial blindness) or quantitative (e.g., visual acuity of 6/18) in a database (e.g., storage 308 (FIG. 3), media content source 416 (FIG. 4), media guidance data source 418 (FIG. 4), supplemental data source 424 (FIG. 4), and/or any database accessible via communications network 414 (FIG. 4)) associated with measures for disabilities to identify the supplemental data. The media guidance application may then have supplemented the media asset with the supplemental data such that the user can comprehend the media asset.

In some embodiments, the supplemental data may have been received (e.g., via I/O path 302 (FIG. 3)) as a set of instructions (e.g., for generating media objects for presentation with the media asset on display 520) that may be processed (e.g., using processing circuitry 306 (FIG. 3)) by the media guidance application. Alternatively or additionally, the supplemental data may have been received as one or more media objects (e.g., for overlaying onto, or presenting with) for presentation on display 520. Alternatively or additionally, the supplemental data may include one or more media assets for presentation of one or more portions of the media asset on display 520.

FIG. 5C shows another illustrative example of a display featuring the display of FIG. 5A supplemented by supplemental data in accordance with some embodiments. It should be noted that display 530 is illustrative only and should not be taken to be limiting in any manner. For example, in some embodiments, one or more of the features of display 100 and/or display 200 may be incorporated into display 530. In some embodiments, display 530 may appear on the display (e.g., display 312 (FIG. 3)) of a user equipment device (e.g., user equipment device 402, 404, and/or 406 (FIG. 4)). Moreover, the media guidance application may use one or more steps from one or more of the processes described in FIGS. 6-7 below to generate display 530 or any of the features described therein.

In display 530, the media asset of display 500 (FIG. 5A) has been supplemented with supplemental data. Specifically, the media asset of display 530 now includes textual summary 510, which provides a textual description of the circumstances and context appearing in the media asset. For example, a media guidance application (e.g., implemented on user equipment 402, 404, and/or 406 (FIG. 4)) may have determined that based on a measure of a disability of the user that the user cannot comprehend the media asset. For example, the media guidance application may have determined (e.g., using control circuitry 304 (FIG. 3)) that the user was partially deaf (e.g., has a hearing loss of 26 to 40 dB). In response to determining the user cannot comprehend the media asset based on the disability, the media guidance application may have requested supplemental data, which corresponds to the measure of the disability of the user. For example, the media guidance application may have cross-referenced (e.g., using control circuitry 304 (FIG. 3)) a qualitative (e.g., partial hearing loss) or quantitative (e.g., hearing loss of 26 to 40 dB) in a database (e.g., storage 308 (FIG. 3), media content source 416 (FIG. 4), media guidance data source 418 (FIG. 4), supplemental data source 424 (FIG. 4), and/or any database accessible via communications network 414 (FIG. 4)) associated with measures for disabilities to identify the supplemental data. The media guidance application may then have supplemented the media asset with the supplemental data such that the user can comprehend the media asset. For example, the media guidance application may present textual summaries of the circumstances and context of a media asset (e.g., as shown in display 530 (FIG. 5C)) or the media guidance application may instruct a user device (e.g. user equipment device 402, 404, and/or 406 (FIG. 4)) associated with display 530 (FIG. 5C) to increase the presentation audio volume of the media asset.

In some embodiments, the media guidance application may supplement (or replace) specific portions of a media asset. For example, the media guidance application may receive (e.g., via I/O path 302 (FIG. 3)) data describing the circumstances and context of the media asset or specific portions of the media asset (e.g., from media content source 416, media guidance data source 418, supplemental data source 418, and/or any location accessible via communications network 414 (FIG. 4)). Based on the data describing the circumstances and context of the media asset or specific portions of the media asset, the media guidance application may determine what information is necessary or required for supplementing the media asset.

In some embodiments, the media guidance application may also receive (e.g., via I/O path 302 (FIG. 3)) the data describing the circumstances and context of the media asset or specific portions of the media asset with the media asset (e.g., as metadata). For example, the data describing the circumstances and context of the media asset or specific portions of the media asset may be received by the media guidance application in real-time as the media asset is received. Additionally or alternatively, the media guidance application may receive the data describing the circumstances and context of the media asset or specific portions of the media asset before a media asset is displayed. For example, the media guidance application may receive (e.g., via I/O path 302 (FIG. 3)) and store the data describing the circumstances and context of the media asset or specific portions of the media asset on local memory (e.g., on storage 308 (FIG. 3)).

In some embodiments, the media guidance application may use media guidance data (e.g., a title, presentation time, etc.) to locate the data describing the circumstances and context of the media asset or specific portions of the media asset. For example, the media guidance application may cross-reference (e.g., using control circuitry 304 (FIG. 3)) the media guidance data associated with the media asset in a database (e.g., supplemental data source 424 (FIG. 4)) to determine the supplemental data for use with a media asset or a particular portion of the media asset. In some embodiments, the database may be structured as a lookup table. For example, the media guidance application may query (e.g., using control circuitry 304 (FIG. 3)) the database with the media guidance data associated with the media asset. The media guidance application may then filter the results of the query using a specific measure of a disability of a user. For example, the media guidance data may identify the particular scene shown in display 500 (FIG. 5A). The media guidance application may then filter (e.g., using control circuitry 304 (FIG. 3)) all of the available supplemental data for the identified scene with the measure of the disability of the user. Based on the filtering, the media guidance application may determine the particular supplemental data that corresponds to the measure of the disability of the user.

For example, if the user is partially blind, the media guidance application, may filter the results of the query for supplemental data associated with a user with that disability (e.g., partial blindness, visual acuity below 6/18, astigmatisms, etc.). In response, the media guidance application may receive (e.g., via I/O path 302 (FIG. 3)) the supplemental data used with display 520 (FIG. 5B). Alternatively or additionally, if the user is partially deaf, the media guidance application may filter (e.g., using control circuitry 304 (FIG. 3)) the results of the query for supplemental data associated with a user with that disability (e.g., partial hearing loss, hearing loss of 26 to 40 dB, etc.). In response, the media guidance application may receive the supplemental data used with display 530 (FIG. 5C).

In some embodiments, the media guidance application may determine the particular circumstances or context of the media asset using content-recognition modules discussed above in relation to FIG. 3. For example, the media guidance application may analyze each frame of the media asset (e.g., either in real-time or before presentation of the media asset) to determine the circumstances and context of a media asset or a specific portion of a media asset. For example, the media asset shown in display 500 (FIG. 5A) may include a series of frames. For each frame of the media asset, the media guidance application (e.g., via control circuitry 304 (FIG. 3)) may use an object recognition module, incorporated with or accessible to the media guidance application, to determine the circumstances and context of the media asset for use in determining whether or not a user will comprehend the media asset (or portion of the media asset) based on a disability associated with the user. In some embodiments, the results of the analysis (e.g., the determined circumstances and context of the media assets) may be transmitted (e.g., using I/O path 302 (FIG. 3)) to a remote location (e.g., media content source 416, media guidance data source 418, supplemental data source 418, and/or any location accessible via communications network 414 (FIG. 4)) for cross-reference with a database for use in identifying suitable supplemental data. In some embodiments, the results of the analysis may be processed locally (e.g., using processing circuitry 306 (FIG. 3)) to identify suitable supplemental data.

Figure 6:
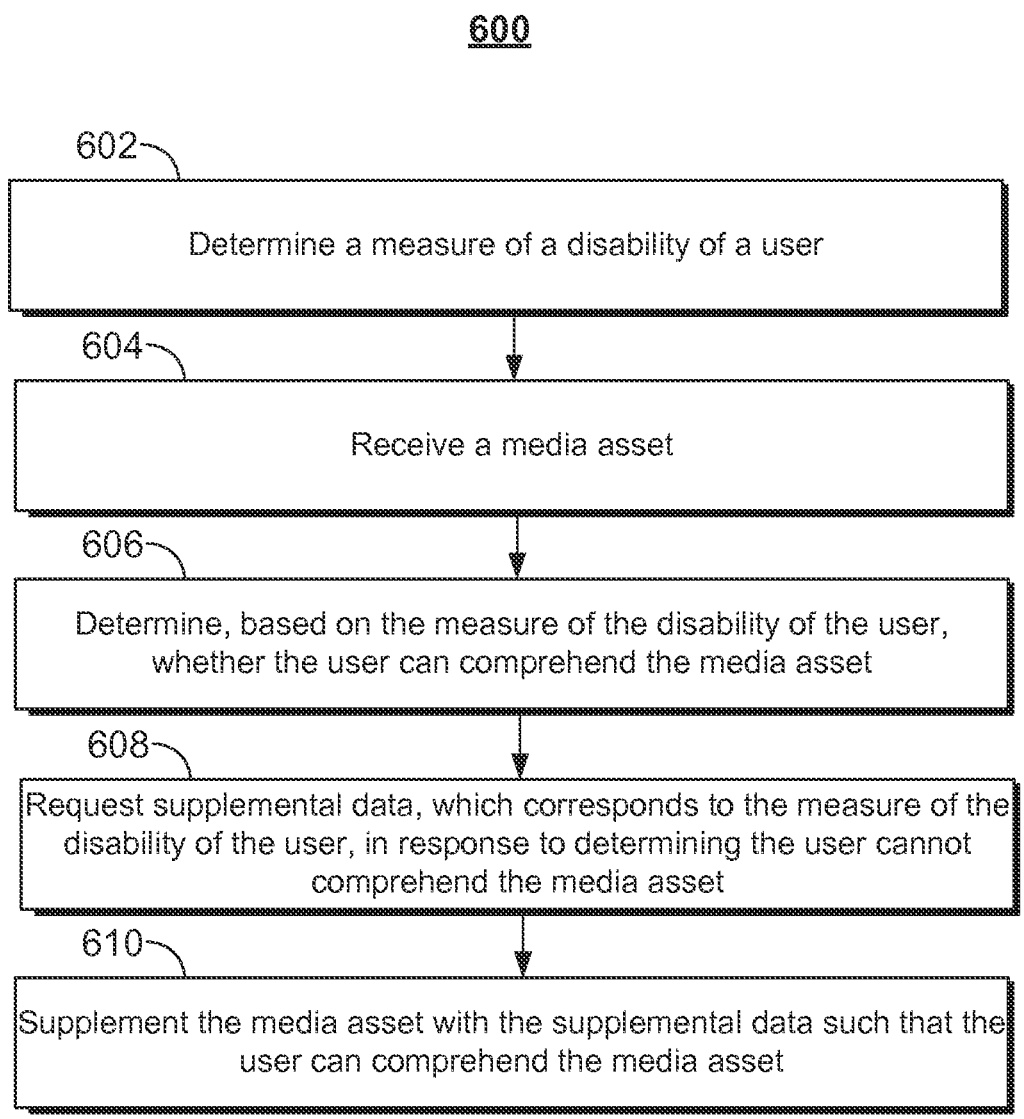
FIG. 6 is a flowchart of illustrative steps for supplementing a media asset with supplemental data such that the user can comprehend the media asset in accordance with some embodiments of the disclosure.

FIG. 6 is a flowchart of illustrative steps for supplementing a media asset with supplemental data such that the user can comprehend the media asset in accordance with some embodiments. Process 600 may be used to customize a user input interface (e.g., display 500 (FIG. 5A)) on a display device (e.g., display 312 (FIG. 3)). It should be noted that process 600, or any step thereof, could occur on, or be provided by, any of the devices shown in FIGS. 3-4. For example, process 600 may be executed by control circuitry 304 (FIG. 3) as instructed by the media guidance application (e.g., implemented on any of the devices shown and described in FIG. 4).

At step 602, the media guidance application determines a measure of a disability of a user. For example, the media guidance application (e.g., via control circuitry 304 (FIG. 3)) may determine the measure of the disability of the user by actively or passively (e.g., as described below in relation to process 700 (FIG. 7)) monitoring user inputs, associated with media assets, of the user to generate a user profile, and cross-referencing the user profile with a database associated with measures for disabilities to determine the measure of the disability of a user. In some embodiments, the media guidance application generates a user profile of the abilities and disabilities of the user in order to supplement media assets to compensate for the particular disabilities of the user. For example, the media guidance application may receive a user input (e.g., a selection of a disability setting) of the disabilities and/or a measure of a disability of a user. In another example, based on prior interactions with the media guidance application, the media guidance application (e.g., via control circuitry 304 (FIG. 3)) may passively monitor a user to develop a user profile of the user (e.g., the number of errors.

In some embodiments, the measure of a disability may be a qualitative or quantitative description of a disability of a user. For example, the measure of the disability may be a qualitative description (e.g., partially blind). The media guidance application may then input the description into a database (e.g., a lookup table) to locate supplemental data associated with the condition. Additionally or alternatively, the measure of the disability may be a quantitative description (e.g., a numerical representation of the disability) which may be input into database to locate supplemental data associated with the condition. In some embodiments, the media guidance application may obtain one or more qualitative description of the measure of the disability to generate the quantitative description.

At step 604, the media guidance application receives a media asset. For example, the media guidance application may receive (e.g., via I/O path 302 (FIG. 3)) a media asset (e.g., as shown in display 500 (FIG. 5A)). The media asset (e.g., an advertisement) may include circumstances and context that are only provided to the viewer through multiple sensory channels. For example, the media asset may require a viewer to comprehend that based on the facial expressions of a character while the character speaks, the dialog of the character is meant to be sarcastic. A viewer with one or more disabilities may not fully appreciate the circumstances and/or context of the media asset if the viewer cannot comprehend that the dialog is meant to be sarcastic.

In some embodiments, the media guidance application may also receive (e.g., via I/O path 302 (FIG. 3)) or generate (e.g., via control circuitry 304 (FIG. 3)) data describing the circumstances and context of the media asset or specific portions of the media asset with the media asset (e.g., as metadata). For example, the media guidance application may receive data describing the circumstances and context of the media asset or specific portions of the media asset, which may be used to identify appropriate supplemental data, or may use one or more content-recognition modules to determine the circumstances and context of the media asset or specific portion of the media asset, as described above.

At step 606, the media guidance application determines, based on the measure of the disability of the user, whether or not the user can comprehend the media asset. For example, based on a qualitative or quantitative description of the measure of the disability of the user, the media guidance application may determine whether or not the user will comprehend the circumstances and context of the media asset.

For example, as explained below in relation to process 700 (FIG. 7), in some embodiments, the media guidance application determines (e.g., via control circuitry 304 (FIG. 3)) a user disability level, which is based on the measure of disability of the user determined in step 602 above. The media guidance application also determines a threshold disability level for the media asset, which indicates a measure of disability that would prevent users from comprehending the media asset.

In some embodiments, the media guidance application may individually determine threshold disability levels for a plurality of media asset. In some embodiments, the threshold disability level for each media asset may be assigned by the media guidance application upon analysis (e.g., performed using a content-recognition module incorporate into or accessible by control circuitry 304 (FIG. 3)) of the media asset. Additionally or alternatively, the threshold disability level for each media asset may be retrieved from a database associated with the threshold disability levels associated with media assets or specific portions of media assets (e.g., located at storage 308 (FIG. 3), media content source 416 (FIG. 4), media guidance data source 418 (FIG. 4), supplemental data source 424 (FIG. 4), and/or any database accessible via communications network 414 (FIG. 4)).

The media guidance application may then compare (e.g., via control circuitry 304 (FIG. 3)) the threshold disability level to the user disability level. If the threshold disability level for the media asset exceeds the user disability level (e.g., indicating that based on the disability of the user, the user is not likely to comprehend the media asset), the media guidance application requests supplemental data, for presentation with the media asset (e.g., as shown in display 520 (FIG. 5B)) in order to ensure that the user comprehends the media asset.

At step 608, the media guidance application requests supplemental data, which corresponds to the measure of the disability of the user, in response to determining the user cannot comprehend the media asset. For example, the media guidance application may (e.g., via control circuitry 304 (FIG. 3)) transmit an instruction (e.g., via I/O path 302 (FIG. 3)) to a remote location (e.g., media content source 416, media guidance data source 418, supplemental data source 424, and/or any database accessible via communications network 414 (FIG. 4)) requesting supplemental data that may be presented with the media asset.

For example, in some embodiments, the media guidance application may query a database for supplemental data specific to a particular media asset or portion of a media asset and/or a measure of a disability unique to the user. For example, the media guidance application may identify the specific media asset or portion of the media asset by media guidance data (e.g., a title, presentation time, current point of progress in the runtime of the media asset, etc.) associated with the media asset. The media guidance application may cross-reference (e.g., using control circuitry 304 (FIG. 3)) the media guidance data associated with the media asset in a database (e.g., supplemental data source 424 (FIG. 4)) to determine the supplemental data for use with a media asset or a particular portion of the media asset. The media guidance application may then filter the results of all available supplemental data for the specific media asset or portion of the media asset based on the specific measure of a disability of a user.

For example, the media guidance data may identify the particular scene shown in display 500 (FIG. 5A). The media guidance application may then filter (e.g., using control circuitry 304 (FIG. 3)) all of the available supplemental data for the identified scene with the measure of the disability of the user. Based on the filtering, the media guidance application may determine the particular supplemental data that corresponds to the measure of the disability of the user. For example, if the user has colorblindness, the media guidance application, may filter the results of the query for supplemental data corresponding to colorblindness. The media guidance application may then receive (e.g., via I/O path 302 (FIG. 3)) the supplemental data used for supplementing the media asset. For example, the supplemental data may generate media objects describing the colors of the media asset. Alternatively or additionally, if supplemental data corresponding to colorblindness is not available, the media guidance application may present an alternative media asset.

In some embodiments, requesting supplemental data may also involve determining and comparing an adjusted threshold disability level. For example, the media guidance application may determine (e.g., via control circuitry 304 (FIG. 3)) an adjusted threshold disability level for a presentation of the media asset with the supplemental data, in which the adjusted threshold disability level indicates a measure of disability that would prevent users from comprehending the media asset with the supplemental data. For example, the addition of the supplemental data may result in the threshold disability level being lowered to the adjusted threshold disability level. For example, similar to the user disability level and the threshold disability level, the adjusted threshold disability level may be either a qualitative or quantitative description of the comprehension necessary to comprehend a media asset.

Accordingly, when the media guidance application filters (e.g., using control circuitry 304 (FIG. 3)) all of the available supplemental data for the identified scene with the measure of the disability of the user. The media guidance application may also determine whether or not the resulting media asset with supplemental data corresponds to an adjusted threshold disability level equal or below the user disability level. Furthermore, in some embodiments, the media guidance application may determine a difference between the threshold disability level and the user disability level and use the difference to filter the available supplemental data for the identified scene.

At step 610, the media guidance application supplements the media asset with the supplemental data (e.g., retrieved from supplemental data source 424 (FIG. 4)) such that the user can comprehend the media asset. For example, the media guidance application issues an instruction (e.g., via control circuitry 304 (FIG. 3)) to present the media asset with the supplemental data on the display (e.g., display 312 (FIG. 3))

of a user device (e.g., user equipment 402, 404, and/or 406 (FIG. 4)) as shown and described in relation to FIGS. 5A-C.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method.

Figure 7:
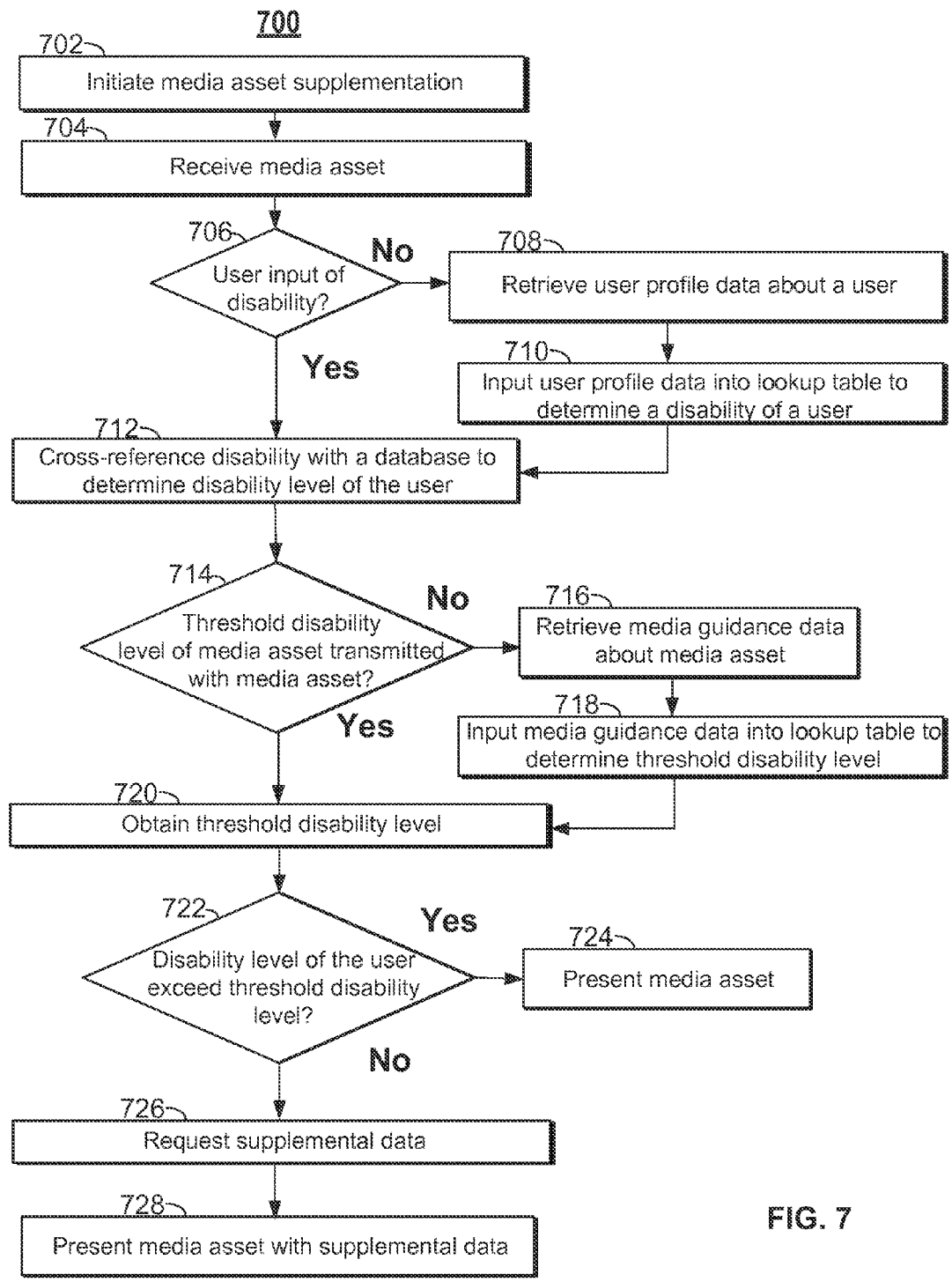
FIG. 7 is a flowchart of illustrative steps for determining whether or not a user will comprehend a media asset in accordance with some embodiments of the disclosure.

FIG. 7 is a flowchart of illustrative steps for determining whether or not a user will comprehend a media asset in accordance with some embodiments. It should be noted that process 700, or any step thereof, could occur on, or be provided by, any of the devices shown in FIGS. 3-4. For example, process 700 may be executed by control circuitry 304 (FIG. 3) as instructed by the media guidance application (e.g., implemented on any of the devices shown and described in FIG. 4).

At step 702, the media guidance application initiates the supplementation of a media asset. For example, the media guidance application may receive (e.g., via user input interface 310 (FIG. 3)), a user input requesting for media assets to be supplemented in order to ensure that a user comprehends the media asset (e.g., a selection of selectable option 204).

At step 704, the media guidance application receives a media asset. In some embodiments, step 704 may correspond to step 604 (FIG. 6). The media guidance application may receive (e.g., via I/O path 302 (FIG. 3)) a media asset (e.g., as shown in display 500 (FIG. 5A)) at the user device (e.g., user equipment device 402, 404, and/or 406 (FIG. 4)) upon which the media guidance application is implemented. For example, the media asset (e.g., a flash based videogame) may include content that is only provided to the viewer through multiple sensory channels. For example, the media asset may require a viewer to match colors with symbols. Therefore, a viewer with one or more disabilities (e.g., color blindness) may not comprehend the entire media asset. Consequently, in order to enjoy the videogame, the user may require supplemental data.

At step 706, the media guidance application determines whether or not a user inputted a disability and/or a measure of the disability. For example, in some embodiments, the media guidance application may prompt a user (e.g., using various games, questions, tests, etc. associated with one or more disabilities). Based on the results, the media guidance application may determine a disability and/or a measure of the disability associated with the user, which may be stored (e.g., in storage 308 (FIG. 3)) in a user profile.

Additionally or alternatively, the user may download (e.g., from a location accessible via communications network 414 (FIG. 4)) information about the disability and/or the measure of the disability of the user. For example, the user may download medical tests or prescription information (e.g., related to a eye-glasses used by a user), which indicate a disability or a measure of disability, directly (e.g., via I/O path 302 (FIG. 3)) to the media guidance application.

If the user inputs information related to the disability and/or the measure of the disability at step 706, the media guidance application proceeds to step 712. If the user does not input information related to the disability and/or the measure of the disability at step 706, the media guidance application proceeds to step 708. At step 708, the media guidance retrieves data about the user from a user profile. For example, the user profile data may include demographic information about a user, including, but not limited to, information retrieved from one or more remote sources (e.g., accessible via communications network 414 (FIG. 4)) such as a Department of Motor Vehicle or medical record database. The user profile data may also include information based on prior interactions with the media guidance application. For example, the data may include typical audio/video settings, user preferences, the typical number of erroneous entries into a user device (e.g., a remote control), the number of incorrect selections (e.g., selecting the wrong media asset from a media guide), or any other information that may be indicative of a disability or measure of a disability of a user. At step 710, the media guidance application inputs user profile data into a lookup table to determine a disability or a measure of disability of a user. For example, based on the user profile data the media guidance application assigned a qualitative or quantitative description of the disability or extent of the disability of the user.

At step 712, the media guidance application cross-references disability and/or the measure of the disability with a database to determine a disability level of a user. For example, in some embodiments, the media guidance application may compare a disability level of the user with a threshold disability level associated with the media asset. In such cases, the media guidance application may receive an output of a disability level of the user based on an input of the disability and/or the measure of the disability of the user into the database (e.g., located at storage 308 (FIG. 3) and/or any location accessible via communications network 414 (FIG. 4)).

At step 714, the media guidance application determines whether the threshold disability level of the media asset was transmitted with the media asset. The threshold disability level indicates a measure of a disability that would prevent users from comprehending a media asset. For example, whether or not a particular user may comprehend a given media asset may be determined based on a threshold disability level of the media asset. If the threshold disability level of the media asset was transmitted with the media asset (e.g., as metadata), the media guidance application proceeds to step 720 and obtains the threshold disability level.

If the threshold disability level of the media asset was not transmitted with the media asset, the media guidance application proceeds to step 716. At step 716, the media guidance application retrieves (e.g., from media guidance data source 418 (FIG. 4)), the media guidance data associated with the media asset (e.g., title, schedule information, etc.). The media guidance application then inputs the retrieved media guidance data into a lookup table (e.g., located at media content source 416, media guidance data source 418, supplemental data source 424, and/or any location accessible via communications network 414 (FIG. 4)) to obtain the threshold disability level associated with the media asset at step 720.

Additionally or alternatively, the media guidance application may generate (e.g., via content-recognition modules accessible by the media guidance application) the threshold disability level by analyzing what information is provided by different sensory channels (e.g., what information is provided by video content, audio content, etc.) in the media asset.

At step 722, the media guidance application determines whether or not the disability level of the user exceeds the threshold disability level of the media asset. If the threshold disability level does not exceed the user disability level, the media guidance application presents the media asset without the supplemental data at step 724. If the threshold disability level for the media asset exceeds the user disability level, the media guidance application requests supplemental data at step 726.

In some embodiments, step 726 corresponds to step 608. In some embodiments, requesting supplemental data may also involve determining and comparing an adjusted threshold disability level as explained above. For example, the media guidance application may determine (e.g., via control circuitry 304 (FIG. 3)) an adjusted threshold disability level for a presentation of the media asset with the supplemental data. For example, the addition of the supplemental data may result in the threshold disability level being lowered to the adjusted threshold disability level. At step 728, the media guidance application presents the media asset with the supplemental data.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of compensating for disabilities of a user when presenting media assets through multiple sensory channels, the method comprising:
   determining, by a user device, a measure of a sensory disability of a user;
   receiving, by the user device, a media asset through one of the multiple sensory channels;
   determining, the user device, based on the measure of the sensory disability of the user, whether the user can comprehend the media asset by:
      prompting the user to input information, associated with media assets, to generate a user profile;
      determining a user disability based on the input information; and
      comparing the user profile with a database associated with measures for disabilities to determine the measure of the sensory disability of the user;
   in response to determining the user cannot comprehend the media asset based on the measure of the sensory disability of the user, requesting supplemental data, wherein the supplemental data corresponds to the measure of the sensory disability of the user; and
   supplementing, at the user device, the media asset with the supplemental data such that the user can comprehend the media asset.

2. The method of claim 1, further comprising determining a context of a portion of the media asset.

3. The method of claim 2, further comprising identifying appropriate supplemental data for the portion of the media asset based on the context of the portion of the media asset.

4. The method of claim 1, further comprising filtering a set of available supplemental data based on the measure of the sensory disability of the user.

5. The method of claim 1, wherein determining the measure of the sensory disability of the user further comprises receiving a user selection of the measure of the sensory disability of the user.

6. The method of claim 1, wherein determining the measure of the sensory disability of the user further comprises generating a quantitative description of the measure of the sensory disability of the user based on at least one qualitative description of the measure of the sensory disability of the user.

7. The method of claim 1, further comprising in response to determining that the supplemental data is not available, presenting an alternative media asset.

8. The method of claim 1, further comprising:
   determining a measure of blindness of the user; and in response to the determining, supplementing the media asset with supplemental data in an audio format.

9. The method of claim 1, further comprising:
   determining a measure of deafness of the user; and in response to the determining, supplementing the media asset with supplemental data in a video format.

10. A system for compensating for disabilities of a user when presenting media assets through multiple sensory channels, the system comprising control circuitry for:
    determining a measure of a sensory disability of a user;
    receiving a media asset through the one of the multiple sensory channels;
    determining based on the measure of the sensory disability of the user, whether the user can comprehend the media asset by:
       prompting the user to input information, associated with media assets, to generate a user profile;
       determining a user disability based on the input information; and
       comparing the user profile with a database associated with measures for disabilities to determine the measure of the sensory disability of the user;
    in response to determining the user cannot comprehend the media asset based on the measure of the sensory disability of the user, requesting supplemental data, wherein the supplemental data corresponds to the measure of the sensory disability of the user; and
    supplementing the media asset with the supplemental data such that the user can comprehend the media asset.

11. The system of claim 10, wherein the control circuitry is further for determining a context of a portion of the media asset.

12. The system of claim 11, wherein the control circuitry is further for identifying appropriate supplemental data for the portion of the media asset based on the context of the portion of the media asset.

13. The system of claim 10, wherein the control circuitry is further for filtering a set of available supplemental data based on the measure of the sensory disability of the user.

14. The system of claim 10, wherein determining the measure of the sensory disability of the user further comprises receiving a user selection of the measure of the sensory disability of the user.

15. The system of claim 10, wherein determining the measure of the sensory disability of the user further comprises generating a quantitative description of the measure of the sensory disability of the user based on at least one qualitative description of the measure of the sensory disability of the user.

16. The system of claim 10, wherein the control circuitry is further for presenting an alternative media asset in response to determining that the supplemental data is not available.

17. The system of claim 10, wherein the control circuitry is further for:
    determining a measure of blindness of the user; and in response to the determining, supplementing the media asset with supplemental data in an audio format.

18. The system of claim 10, wherein the control circuitry is further for:
    determining a measure of deafness of the user; and
    in response to the determining, supplement the media asset with supplemental data in a video format.

* * * * *